(12) United States Patent
Wiesneth et al.

(10) Patent No.: US 7,980,372 B2
(45) Date of Patent: Jul. 19, 2011

(54) DEVICE FOR DAMPING ROTARY OSCILLATIONS

(75) Inventors: Bernhard Wiesneth, Erlangen (DE); Harald Hochmuth, Hagenbuchach (DE); Alexander Zernickel, Herzogenaurach (DE); Sigurd Wilhelm, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 664 days.

(21) Appl. No.: 11/574,168

(22) PCT Filed: Jun. 22, 2005

(86) PCT No.: PCT/EP2005/006739
§ 371 (c)(1),
(2), (4) Date: Jun. 26, 2007

(87) PCT Pub. No.: WO2006/021254
PCT Pub. Date: Mar. 2, 2006

(65) Prior Publication Data
US 2008/0093189 A1    Apr. 24, 2008

(30) Foreign Application Priority Data
Aug. 24, 2004   (DE) .......................... 10 2004 040 810

(51) Int. Cl.
*F16D 47/04*   (2006.01)
*F16F 15/10*   (2006.01)

(52) U.S. Cl. ...................................... 192/46; 192/104 B

(58) Field of Classification Search ................... 192/42, 192/103 B, 105 CD, 46, 48.6, 104 B
See application file for complete search history.

(56) References Cited

U.S. PATENT DOCUMENTS

| 1,689,913 | A | | 10/1928 | Carrey | |
|---|---|---|---|---|---|
| 2,323,353 | A | * | 7/1943 | Plog | 192/46 |
| 3,782,355 | A | * | 1/1974 | Hamman | 123/185.3 |
| 7,347,309 | B2 | * | 3/2008 | Wiesneth et al. | 192/45 |
| 2006/0021835 | A1 | * | 2/2006 | Kimes et al. | 192/46 |

FOREIGN PATENT DOCUMENTS

| DE | 1073806 | 1/1960 |
|---|---|---|
| DE | 4434324 | 4/1995 |
| DE | 19511188 | 11/1998 |
| DE | 10253495 | 9/2003 |
| JP | 5616247 | 12/1981 |
| JP | 63083429 | 4/1988 |

* cited by examiner

*Primary Examiner* — David D Le
*Assistant Examiner* — Ryan Dodd
(74) *Attorney, Agent, or Firm* — Volpe and Koenig, P.C.

(57) ABSTRACT

A device for damping rotary oscillations in a drive train with a freewheel clutch (27) located between a pulley (25) and a rotor hub (26) is provided. The hub (26) is connected to an input shaft of an auxiliary unit, and the pulley (25) is connected to a crankshaft via a traction means, and the freewheel clutch (27) has an inner ring (34), which surrounds the hub (26) while being fixed thereto, and includes an outer ring (35), which surrounds the inner ring (34) with radial play and which is fixed to the pulley (25). At least one locking element (36) that is actuated by centrifugal force is provided in the inner ring (34), and at least one locking receptacle (37) is provided in the outer ring (35).

9 Claims, 3 Drawing Sheets

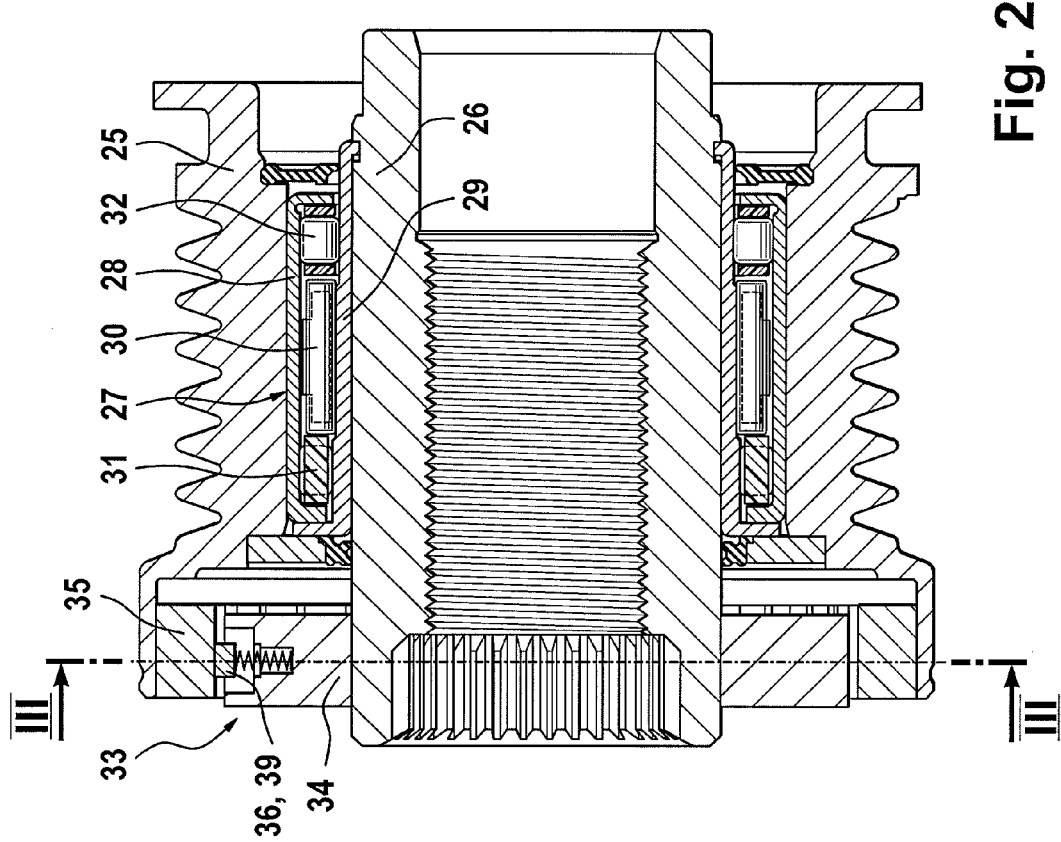
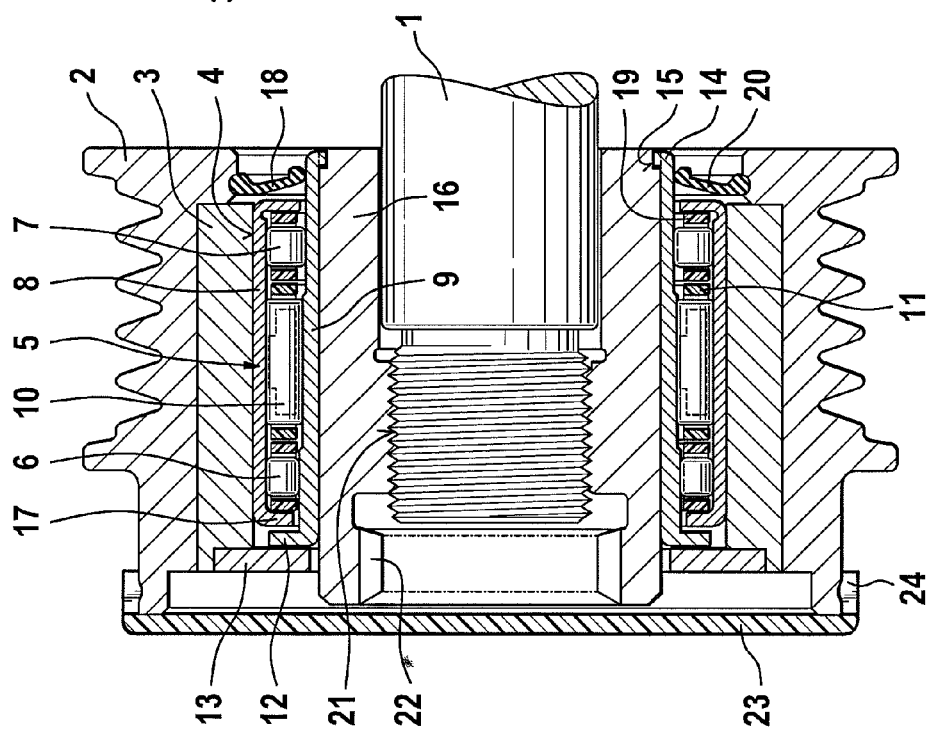
Fig. 2
Fig. 1 (Prior Art)

DEVICE FOR DAMPING ROTARY OSCILLATIONS

BACKGROUND

The invention relates to a device for damping rotary oscillations in a drive train, in particular for auxiliary units in a of a reciprocating piston internal combustion engine, with a freewheel clutch situated between a pulley and a hub. The hub is connected to an input shaft of an auxiliary unit and the pulley is connected to a crankshaft via a traction means. The freewheel clutch comprises an inner ring, which surrounds the hub and which is fixed thereto, and an outer ring, which surrounds the inner ring with radial play and which is fixed to the pulley.

Due to the increasing demands on the automotive industry to reduce average fuel consumption, for an internal combustion engine, for example, a belt-driven starter generator is used. This novel technology is used preferably in combination with gasoline or diesel engines with direct fuel injection. Due to the unfavorable driving gear dynamics that such engines exhibit, the desire has been suggested to be able to use a traction means drive with a generator-freewheel belt pulley (OAP, Overrunning Alternator Pulley). Here, the proven operation of a generator freewheel should be used.

Such a freewheel combined with a pulley is known, for example, from the publication DE 195 11 188 A1. Such a freewheel transmits the traction means drive moment generated by the crankshaft to an input shaft of the auxiliary unit. The freewheel belt pulley reduces the irregularities coming from the crankshaft, in that it partially "slips." This behavior is undesirable for the use of a starter as an auxiliary unit. In this respect, this represents a special auxiliary unit since the moment is transmitted in the reverse direction from the auxiliary unit to the crankshaft. Therefore, it is necessary to lock the generator in rotation with the pulley in the starting phase.

On the other hand, after the starting phase, for optimal functioning of the generator, it is necessary to provide the most uniform drive possible for this generator, which can be realized via a freewheel. The solution presented in DE 44 34 324 to use a hydrostatic coupling to couple auxiliary units into a drive unit is unsuitable, because there is not necessarily any hydraulic pressure during the starting phase.

SUMMARY

Therefore, the invention is based on the objective of allowing the internal combustion engine to be started by means of the generator. For this purpose, a starter mechanism, which automatically decouples the starter function of the pulley as a function of the rotational speed after a starting process, is integrated into the generator-freewheel pulley.

This objective is met according to the invention in that between the pulley and the hub there is freewheel clutch comprising an inner ring, which surrounds the hub and which is fixed thereto, and an outer ring, which surrounds the inner ring with radial play and which is fixed to the pulley. Here, in the inner ring there is at least one locking element that is actuated depending on centrifugal force and in the outer ring there is at least one locking receptacle.

Below a certain rotational speed limit, that is, at a standstill and also at a lower engine rotational speed, the locking element engages in the locking receptacle. Thus, the pulley and the hub connected to the input shaft of the generator are locked, so that the auxiliary generator unit can be used as a starter. During starting, torque is carried from the input shaft of the auxiliary unit into the inner ring and via the positive-fit locking to the outer ring and then via the pulley to a traction means connected to the crankshaft: thus the internal combustion engine can be started.

At higher rotational speeds, the locking elements leave the locking receptacles of the outer ring due to centrifugal force and open these up opposite the inner ring with the hub. In this case, only the freewheel clutch acts between the hub and the pulley and the auxiliary unit can be used as a generator. The belt pulley can satisfy its normal function for a decoupled generator mass. Thus, the invention allows the use of a starter generator in the drive of an internal combustion engine.

An essential advantage of the invention is the arrangement of the locking element on the inner ring. When the internal combustion engine is turned off, the locking element remains in position for an outer ring that is no longer rotating and an inner ring that is still rotating due to the slowing input shaft until the rotational speed of the inner ring falls below the predetermined rotational speed limit. Then the difference in speed between the inner and outer rings is also so small that the locking element can lock reliably and quickly. In contrast, for an arrangement of the locking element on the outer ring, the engagement is prevented as long as the inner ring is rotating too quickly. On one hand, this makes itself noticeable through undesired clicking latching noises in rapid succession and, on the other, this process damages the material.

Especially advantageous is a construction of several locking receptacles in the outer ring. Therefore, the necessary rotational angle between the inner ring and outer ring can be held as small as possible. If several locking elements are located on the inner ring, then it is especially preferable to form teeth on the outer ring as locking receptacles, with its number of teeth being a whole-number multiple of the number of locking elements. Therefore, all of the locking elements can engage simultaneously, which reduces the loads and further shortens the engagement time.

The field of use of the device according to the invention is not limited to a starter generator. In addition, this device can be used anywhere in a drive train where devices are arranged for damping rotary oscillations according to the state of the art.

In summary, the device according to the invention reliably couples and decouples the starter of a starter generator when a rotational speed limit is reached for simultaneously minimizing the noise emission and the material wear.

BRIEF DESCRIPTION OF THE DRAWINGS

The invention is explained in more detail below with reference to an especially advantageous embodiment and is shown in the associated drawings. Shown are:

FIG. 1 a longitudinal cross-sectional view of a device for damping rotary oscillations according to the state of the art;

FIG. 2 a longitudinal cross-sectional view of a device according to the invention for damping rotary oscillations;

DETAILED DESCRIPTION OF THE PREFERRED EMBODIMENTS

Figure 3A:
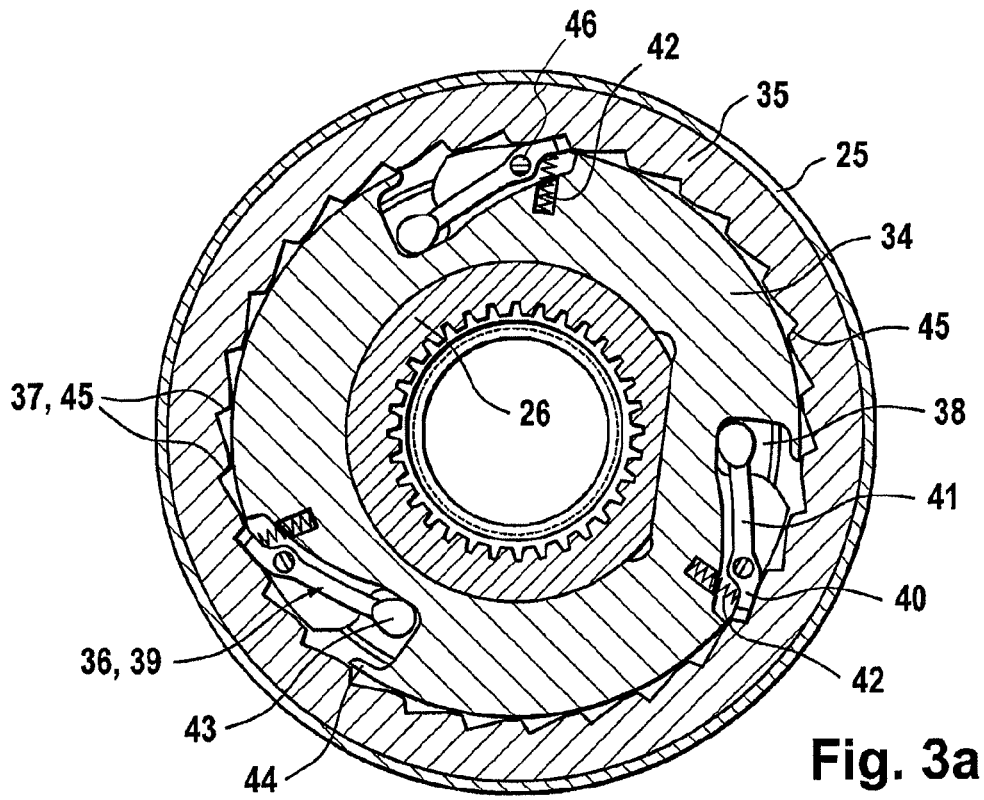
FIG. 3*a* a cross-sectional view of the device according to the invention along the sectional line III-III before the starting process of the internal combustion engine.

A previously known device shown in FIG. 1 for damping rotary oscillations surrounds an input shaft 1 of an auxiliary unit (not shown). The input shaft 1 is driven by a pulley 2 and a traction means not shown in more detail of a driven pulley, which is connected to the crankshaft of an internal combustion engine. The pulley 2 has a reinforcing ring 3 in its interior. A component composed of a freewheel clutch 5 and two cylindrical roller bearings 6 and 7 is inserted in a bore 4 of this ring. Here, a common bearing outer ring 8 and a common bearing inner ring 9 are provided for the component. The bearing inner ring 9 has several clamping ramps (not shown), which are distributed on the periphery and which interact with a corresponding number of clamping rollers 10. Here, the clamping rollers are guided into a cage 11 and biased by means of not-shown springs opposite the clamping ramps. The bearing outer ring 8 essentially has a sleeve shape and has a constant inner diameter over its entire length, wherein it forms tracks for the cylindrical roller bearings 6 and 7 and also the clamping rollers 10.

The bearing inner ring 9 is provided on its end facing away from the auxiliary unit with a radially outward directed rim 12, which is supported on the end on a contact plate 13 fixed in the reinforcing ring 3. At its other axial end, the bearing inner ring 9 has a shoulder 14, which is formed, for example, with a tooth-like shape and which engages in individual longitudinal grooves 15 that, in turn, are a component of a hub 16. At its one end, the bearing outer ring 8 has a first rim 17, which is gripped from behind by the rim 12 of the bearing inner ring 9. A second rim 18 of the bearing outer ring 8, which is provided on its end facing the auxiliary unit, engages behind a cage 19 of the cylindrical roller bearing 7. A radial sealing ring 20, which is inserted into the belt pulley 2 and which forms a sliding seal with the bearing inner ring 9, is arranged adjacent to this second rim 18. For the purpose of attaching the hub 16 to the input shaft 1, the hub 16 has an internal thread 21, wherein in the interior of the hub 16 at a distance to this internal thread 21 there is a multiple-tooth profile 22 embodied as serrations for engaging an assembly tool. The belt pulley 2 is closed on its end facing away from the auxiliary unit by means of a cover 23, which has an axially projecting edge 24. This snaps in on the periphery of the belt pulley 2.

Figure 3B:
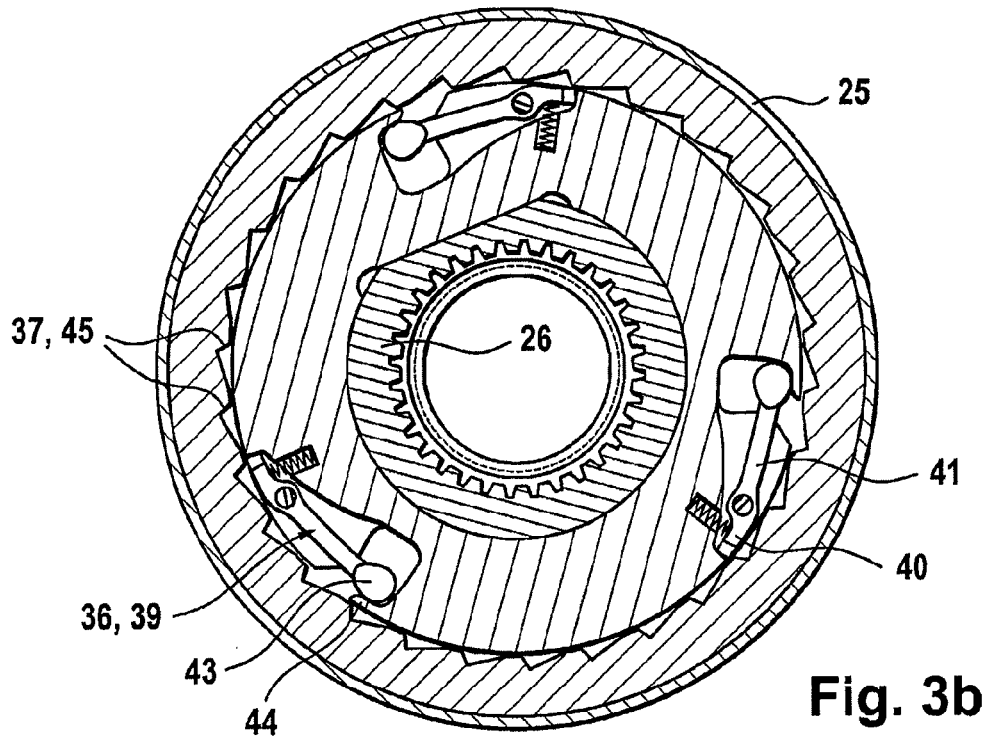
FIG. 3*b* a cross-sectional view of the device according to the invention along the sectional line III-III after the starting process of the internal combustion engine.

A device according to the invention shown in FIGS. 2, 3a, and 3b is constructed essentially in the same manner as the device shown in FIG. 1. It differs from this device in that a centrifugal clutch 33 is arranged between its pulley 25 and its hub 26 in addition to the component comprising a freewheel clutch 27 with a bearing outer ring 28, a bearing inner ring 29, clamping rollers 30, and roller bearings 31 and 32. This centrifugal clutch is comprised of an inner ring 34 with a locking element 36 and an outer ring 35 with locking receptacles 37.

The inner ring 34 is placed on the hub 26 from one end and is fixed rigidly thereto. It contains several recesses 38, which start at its outer surface and in which the locking elements 36 are arranged in the circumferential direction. It is especially preferred to arrange the recesses 38 at uniform distances in the inner ring 34. The outer ring 35 surrounds the inner ring 34 concentrically with radial play. It is inserted into an annular concentric cavity in the pulley 25 from one end and is fixed to the belt pulley 25.

The locking elements 36 are constructed as latches 39. Here, the support of the latches is constructed such that when the inner ring 34 is rotating, one end of the latch is deflected radially outward and the other end is deflected radially inward. For this purpose, the mass center of gravity and rotational point might not match. For a symmetrically shaped latch made from homogeneous material, this is possible through an asymmetric coupling of the latches 39. Therefore, they feature a short lever 40 and a long lever 41, wherein a spring element 42 acts radially outward on the short lever 40. The short lever and long lever are based on a position of a pivot support 46 of the locking element in the inner ring. An additional mass 43 can be mounted on the long lever 41 for reinforcing the centrifugal force.

In the rest state of the device (FIG. 3a), the long levers 41 are located at the farthest possible inward position in the recesses 38 due to the spring force. Simultaneously, a force directed outwards is exerted on the short lever 40 by the spring element 42, so that the short levers 40 are located in the locking receptacles 37 provided for them. The locking receptacles 37 can be realized especially easily as teeth 45. If these teeth 45 are distributed uniformly over the periphery of the outer ring 35 and if their number forms a whole-number multiple of the number of the locking elements 37, then all of the locking elements 37 can engage simultaneously in the teeth 45. Therefore, it is possible to transfer greater forces.

The device according to the invention operates as follows: during the starting of the internal combustion engine, a torque is carried from the input shaft via the hub 26 into the inner ring 34 provided with the latches 39. This starting moment is transmitted by the latches 39 to the outer ring 35 sitting with a positive fit in the pulley 25. The internal combustion engine is started by a traction means wrapped around the pulley 25.

Now if the inner ring rotates with a rotational speed below the rotational speed limit, a higher centrifugal force acts on the longer lever 41 than on the short lever 40. The centrifugal force thus counteracts the spring force. The spring constant of the spring element 42 is set so that the force exerted on the latch 39 by the spring and the centrifugal force at the rotational speed limit are compensated. If the rotational speed increases further, the centrifugal force overcompensates the spring force and the long end 41 of the latch moves outward, while the short end 40 moves radially inward. Therefore, the centrifugal clutch 33 (FIG. 3b) is unlocked. The inner ring 34 is decoupled from the outer ring 34. The freewheel pulley 25 is then decoupled from the generator mass and can fulfill its normal function.

The rotational speed limit can be selected so that it lies just below the freewheeling rotational speed of the internal combustion engine. This ensures that in the normal operation, the centrifugal clutch 33 is always unlocked. After the internal combustion engine is switched off, the rotational speed of the crankshaft and thus of the outer ring 35 decreases rapidly. The rotational speed of the inner ring 34 with the latches 39 decreases more slowly. If its rotational speed eventually falls below the rotational speed limit, then it abruptly relocks with the outer ring 35.

Figure 4:
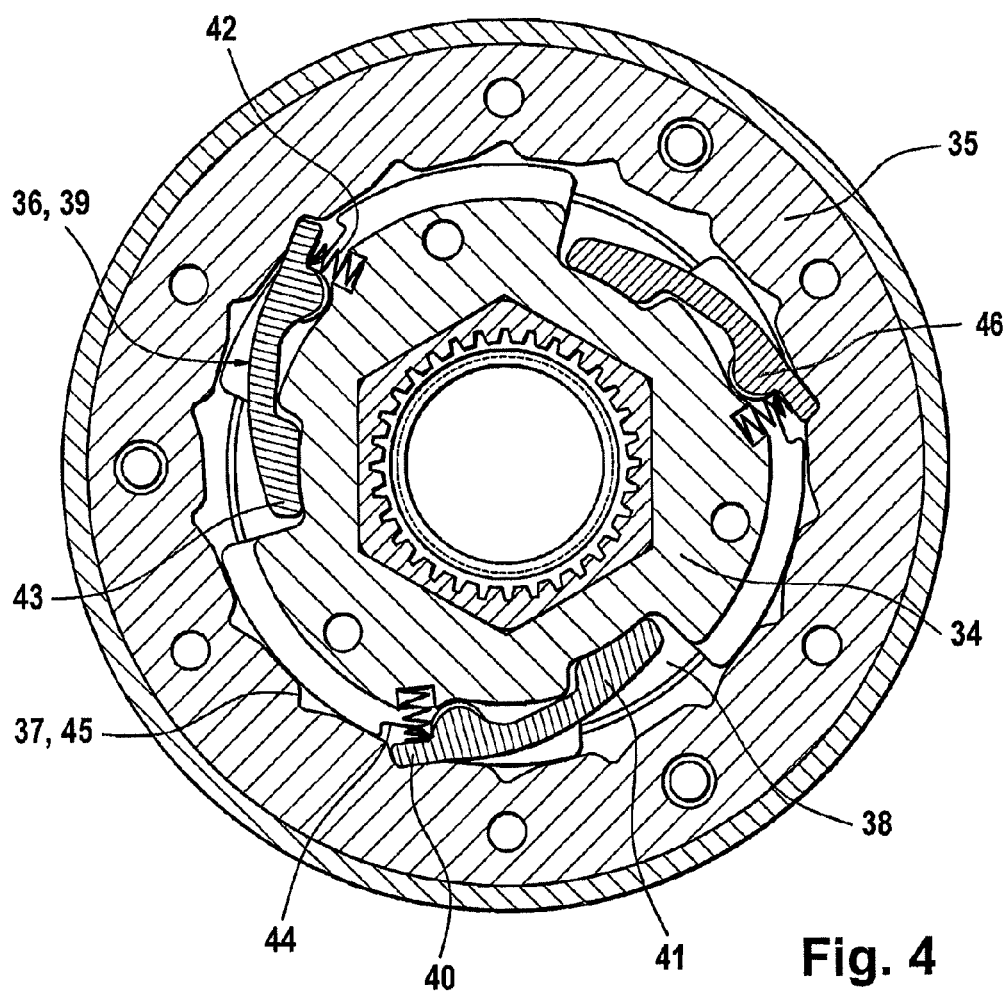
FIG. 4 a cross-sectional view of another device according to the invention before the starting process of the internal combustion engine.

To simplify the matching of the mass of the latches 39, the lengths of the short lever 40 and long lever 41 and the spring element 42, two additional measures can be provided. First, an additional mass 43, which increases the effect of the centrifugal force, can be arranged on the long lever 41. The material and the shape of the additional mass 43 can be adapted arbitrarily to the conditions. Second, the positions, which the long levers 41 or the short levers 40 assume at different rotational speeds, are limited by projections 44, 44' (shown in Fig. 3a for the long levers 41 and FIG. 4 for the short levers 40, respectively). This ensures that, especially at high rotational speeds, the long lever 41 is not moved outward so far that it comes in contact with the outer ring 35 and thus generates noise and wear.

List Of Reference Symbols

1 Input shaft
2 Pulley
3 Reinforcing ring
4 Bore
5 Freewheel clutch
6 Cylindrical roller bearing
7 Cylindrical roller bearing
8 Bearing outer ring
9 Bearing inner ring
10 Clamping roller
11 Cage
12 Rim
13 Contact plate
14 Shoulder
15 Longitudinal groove
16 Hub
17 First rim
18 Second rim
19 Cage
20 Radial sealing ring
21 Inner thread
22 Multiple-teeth profile
23 Cover
24 Edge
25 Pulley
26 Hub
27 Freewheel clutch
28 Bearing outer ring
29 Bearing inner ring
30 Clamping roller
31 Roller bearing
32 Roller bearing
33 Centrifugal clutch
34 Inner ring
35 Outer ring
36 Locking element
37 Locking receptacle
38 Recess
39 Latches
40 Short lever
41 Long lever
Spring element
Additional mass
44, 44' Projection
45 Teeth
46 Pivot support

The invention claimed is:

1. Device for damping rotary oscillations in a drive train, for a starter-generator of a traction drive of a reciprocating piston internal combustion engine, comprising a freewheel clutch situated between a generator-freewheel pulley and a hub, the hub is connected to an input shaft of the starter-generator and the generator-freewheel pulley is connected to a crankshaft via a traction element, and the freewheel clutch has an inner ring, which surrounds the hub and which is fixed thereto, and an outer ring, which surrounds the inner ring with radial play and which is fixed to the generator-freewheel pulley, at least one centrifugal force actuated locking element is arranged in the inner ring and at least one locking receptacle is arranged in the outer ring, and the locking elements are constructed as latches, which each have a short lever and a long lever based on a position of a pivot support of the locking element on the inner ring, wherein a spring element acting in a direction of the outer ring is arranged between the inner ring and the short lever, and the short lever is moveable into and out of engagement with corresponding ones of the locking receptacles.

2. Device according to claim 1, wherein the locking receptacles are arranged one behind the other on the outer ring and the locking elements are arranged one behind the other on the inner ring in a circumferential direction with uniform spacing.

3. Device according to claim 1, wherein all of the locking elements are arranged in the locking receptacles in a rest state.

4. Device according to claim 1, wherein the device for damping rotary oscillations is arranged in a starter generator drive.

5. Device according to claim 1, wherein the latches have an additional mass located on the long lever.

6. Device according to claim 1, wherein a projection limiting a path of the long lever is arranged on a radially outward side of the long lever on the inner ring.

7. Device according to claim 1, wherein a projection limiting a path of the short lever is arranged on a radially inward side of the short lever on the inner ring.

8. Device according to claim 1, wherein the locking receptacles are constructed as teeth arranged uniformly on an inner periphery of the outer ring.

9. Device according to claim 8, wherein a number of the teeth is a whole-number multiple of a number of the locking elements.

* * * * *